United States Patent [19]

Shapiro

[11] Patent Number: 4,884,059
[45] Date of Patent: Nov. 28, 1989

[54] APPARATUS AND METHOD FOR REPORTING VERIFICATION TESTING OF A PERSONAL EMERGENCY RESPONSE SYSTEM

[75] Inventor: L. Dennis Shapiro, Chestnut Hill, Mass.

[73] Assignee: Lifeline Systems, Inc., Watertown, Mass.

[21] Appl. No.: 290,470

[22] Filed: Dec. 27, 1988

[51] Int. Cl.4 .............................................. G08B 29/00
[52] U.S. Cl. ...................... 340/514; 340/505; 340/539; 340/518; 340/531; 340/825.06; 340/825.08; 340/825.54; 340/825.72
[58] Field of Search ............... 340/514, 515, 505, 506, 340/518, 531, 825.06, 825.08, 539, 825.69, 825.72, 825.54; 379/29

[56] References Cited

U.S. PATENT DOCUMENTS

| | | | |
|---|---|---|---|
| 3,833,895 | 9/1974 | Fecteau | 340/505 |
| 3,989,900 | 11/1976 | Dibner . | |
| 4,064,368 | 12/1977 | Dibner . | |
| 4,462,022 | 7/1984 | Stolarczyk | 340/518 |
| 4,491,970 | 1/1985 | LaWhite et al. | 455/100 |
| 4,524,243 | 6/1985 | Shapiro . | |
| 4,656,319 | 4/1987 | Bially | 379/29 |
| 4,683,459 | 7/1987 | Edson | 340/514 |
| 4,694,282 | 9/1987 | Tamura et al. | 340/514 |

*Primary Examiner*—Donnie L. Crosland
*Attorney, Agent, or Firm*—Weingarten, Schurgin, Gagnebin & Hayes

[57] ABSTRACT

An apparatus and method for reporting verification testing of a portable activator is provided for a personal emergency response system. In normal operation of the system, a signal transmitted by the portable activator activates a subscriber unit in a remote subscriber station to transmit an alarm message to a central station, or in some configurations to provide a local test or to cause other local or remote commands and/or control. The subscriber unit according to the present invention includes a latch assembly which is "set" upon receipt of any activating signal transmitted by the portable activator. The system also includes timing/logic circuitry, in the subscriber unit or alternately as part of the equipment of the central station, which automatically activates the subscriber unit upon expiration of a predetermined period of time to transmit a system test message to the central station. A segment of the system test message provides information as to whether the portable activator has been used during the preceding predetermined period of time, as indicated by the status of the latch assembly.

16 Claims, 4 Drawing Sheets

APPARATUS AND METHOD FOR REPORTING VERIFICATION TESTING OF A PERSONAL EMERGENCY RESPONSE SYSTEM

RELATED APPLICATION

This application is related to the U.S. patent applications entitled APPARATUS AND METHOD OF TESTING A PORTABLE ACTIVATOR FOR A PERSONAL EMERGENCY RESPONSE SYSTEM (LIFE-011XX) and A MULTI-STATE SELECTION SWITCH FOR A PERSONAL EMERGENCY RESPONSE SYSTEM (LIFE-013XX), filed concurrently with the present application.

FIELD OF THE INVENTION

This invention relates generally to personal emergency response systems, and more particularly to an apparatus and method of reporting verification testing of a portable activator for a personal emergency response system.

BACKGROUND OF THE INVENTION

Personal emergency response systems are known in the art. Representative examples of such systems are disclosed in U.S. Pat. Nos. 4,656,319, 4,524,243, 4,064,368 and 3,989,900, owned by the assignee of the present application. The personal emergency response system includes a central station and one or more remote subscriber stations such as a residence or business interconnected therewith.

The central station may be any facility such as a hospital, a police station, a fire station, a phone answering service or a burglary alarm monitoring service which responds to alarm messages generated by remote subscriber stations to provide assistance thereto. The central station is interconnected with the remote subscriber stations via communication links.

Various communication links may be utilized to interconnect the central station with remote subscriber stations including telephone communication lines, cable television transmission lines, radio frequency transmissions or dedicated land lines. Typically, telephone communication lines are utilized due to the prevalence of in-place telephone networks and the minimal expense necessary to interface a personal emergency response system with a telephone network.

Each remote subscriber station includes a subscriber unit interfaced with the communications link. Upon activation of subscriber unit in response to a predetermined event, an alarm message is transmitted via the communications link to the central station.

Various means may be utilized to activate the subscriber unit to transmit an alarm message. The subscriber unit may include a timing/logic circuit which is operative to automatically activate the unit upon expiration of a predetermined period of time. A subscriber unit of this type will also include a subscriber-activated reset means which reinitializes the timing circuit. The reset means may be interfaced with any device frequently used by the subscriber such as electrical switches, television sets, radios, refrigerators, stoves or telephones wherein the use of any such device causes the timing circuit to be reset to zero.

The subscriber unit may also be activated by means of a portable activator carried by the subscriber. A portable activator is particularly useful to elderly or infirm subscribers who may be prone to acute emergencies requiring an immediate response. The portable activator also has utility for notifying the central station of an event such as a fire or an intruder in the remote subscriber station. When immediate assistance is required by the subscriber, the portable activator is manually operated to activate the system.

The portable activator is typically a wireless unit which transmits an uncoded or coded signal to activate the subscriber unit. Most commonly the portable activator is a radio transmitter, although infrared and ultrasonic transmitters may also be used.

Since the portable activator is a critical link in the system, it is of paramount importance that the portable activator be periodically tested to insure proper operation thereof, and/or to inform the subscriber of any limiting conditions. Since the portable activator is self-powered, one possible deficiency is the depletion of the power source to such a level that the portable activator is no longer capable of generating a signal which will activate the system. Other possible deficiencies of which the subscriber should immediately be made aware of include any activator malfunction or damage which precludes generation of the activating signal.

In addition to deficiencies affecting the functioning of the portable activator, it will be appreciated that a wireless portable activator may also be subject to range limitations and/or transmission deadspots, that is, locations in the remote subscriber station wherein an activating signal cannot be transmitted to the subscriber unit.

It is therefore of paramount importance that the subscriber be made aware of any functional, range and/or location deficiencies affecting the portable activator. While it is desirous to periodically test the operation of the portable activator, it will be appreciated that such testing should not cause the system to generate and transmit an alarm to the central station. Transmission of an alarm message during testing unnecessarily ties up the resources of the central station which may result in delayed responses to actual emergency conditions in other remote subscriber stations as well as provoking an unnecessary response to the particular remote subscriber station.

A co-pending application, entitled APPARATUS AND METHOD OF TESTING A PORTABLE ACTIVATOR FOR A PERSONAL EMERGENCY RESPONSE SYSTEM, discloses an apparatus and method of testing the operation and/or defining the limitations of a portable activator without degrading the operational capabilities of the central station. While the aforesaid application provides the subscriber with knowledge as to the proper operation of the system, it will be appreciated that the status of the elements of the system located within the remote subscriber stations remains unknown to the central station.

It will be appreciated that subscribers may occasionally be remiss in checking the operation of the portable activator. When portable activators are not periodically checked, the likelihood of nonfunctional activators increases, with a corresponding decrease in the overall effectiveness of the system.

One possible solution to ensure that the operation of portable activators are timely checked is for the central station to periodically communicate with each subscriber to ensure that periodic testing of the portable activator has been accomplished. Such a procedure, however, unnecessarily taxes the resources of the central station.

SUMMARY OF THE INVENTION

To provide a means for automatically verifying the status of each remote subscriber station in the network of a central station, thereby enhancing the overall effectiveness of the personal emergency response system, the present invention is directed to a personal emergency response system which includes means associated with a subscriber unit of a remote subscriber station for indicating that the system has been operated within a preceding predetermined period of time. The system also includes means for automatically transmitting a system test message to the central station at predetermined time intervals.

One embodiment of a system according to the present invention includes a subscriber unit which includes a latch assembly, a verification timing/logic circuit and means for transmitting a system test message to the central station. In another embodiment, the verification timing/logic circuit is included within the equipment of the central station.

The subscriber unit according to the present invention may include a test switch as described in the co-pending application entitled APPARATUS AND METHOD OF TESTING A PORTABLE ACTIVATOR FOR A PERSONAL EMERGENCY RESPONSE SYSTEM which may be selectively operated in a test mode to internally verify the proper functioning and/or operation of a portable activator and the subscriber unit. The subscriber unit may also include a multi-state selection means as described in the co-pending application entitled A MULTI-STATE SELECTION SWITCH FOR A PERSONAL EMERGENCY RESPONSE SYSTEM which permits operation of the system in HOME or AWAY modes.

The latch assembly of the subscriber unit is a dual-state device having a set state or an unset state. Initially the latch assembly is in the unset state. The latch assembly is operative in response to any activating signals transmitted by the portable activator and assumes the set state upon receipt of any activating signal transmitted by the portable activator. The latch assembly remains in the set state even though subsequent activating signals are received by the subscriber unit.

The verification timing/logic circuit included in the subscriber unit or the central station clocks a predetermined period of time. Upon elapse of the predetermined period of time, the verification timing/logic circuit effects activation of the subscriber unit to transmit a system test message to the central station. Prior to generating and transmitting the system test message, the subscriber unit checks the status of the latch assembly to determine whether the latch assembly is in the set or unset state.

In the embodiment wherein the verification timing/logic circuit is disposed at the central station, the verification timing/logic circuit activates the central station upon the elapse of the predetermined period of time. The central station transmits a status check signal to the particular subscriber station to activate the subscriber unit. The subscriber unit checks the status of the latch assembly to determine whether the latch assembly is in the set or unset state and subsequently transmits the system test message.

The subscriber unit according to the present invention also includes means for transmitting the system test message to the central station. A segment of the system test message is reserved to indicate the status of the latch assembly. For example, in a digital system a one bit in a status bit segment indicates that the latch assembly is in the set state. This indicates that the portable activator has been successfully operated within the preceding predetermined period of time. Conversely, a zero bit in the status bit segment indicates that the latch assembly is in the unset state. This indicates that no successful test of the portable activator has occurred within the preceding predetermined period of time.

By means of the apparatus and method for reporting verification testing of the personal emergency response system as described in the preceding paragraphs, the central station is automatically updated every predetermined period of time as to the status of each correspondingly configured remote subscriber station within the network. The central station may then take appropriate action for those remote subscriber stations which have reported no verification testing within the preceding predetermined period of time. The apparatus and method of the present invention increases the overall effectiveness of the personal emergency response system.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

Figure 1:
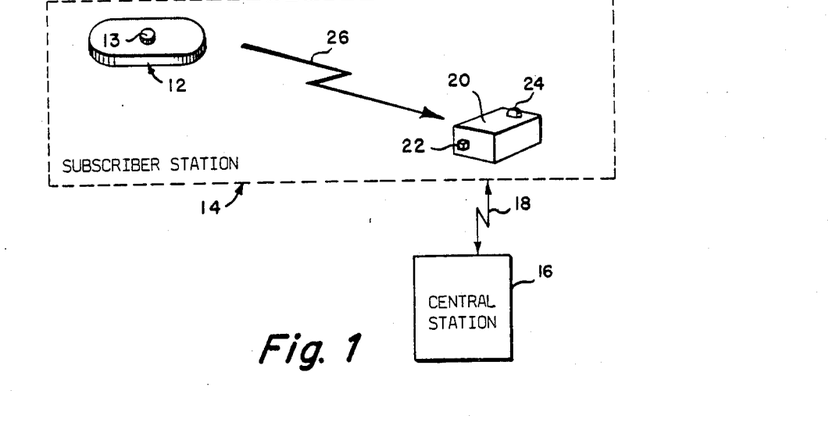
FIG. 1 is a system diagram of a personal emergency response system according to the present invention.

Referring now to the drawings wherein like reference numerals designate corresponding or similar elements throughout the several views, there is shown in FIG. 1 a diagram exemplifying a personal emergency response system 10 according to the present invention. The system 10 includes a portable activator 12, a remote subscriber station 14, a central station 16 and a communications link 18 such as a telephone line interconnecting the remote subscriber station 14 to the central station 16. A subscriber unit 20 is disposed in the remote subscriber station 14 to interface with the communications link 18. The subscriber unit 20 may include a test mode selection switch 22 as described in the co-pending application entitled AN APPARATUS AND METHOD OF TESTING A PORTABLE ACTIVATOR FOR A PERSONAL EMERGENCY RESPONSE SYSTEM which permits the subscriber unit 20 to be selectively operated in a normal mode or a test mode and/or a local annunciator 24.

In one embodiment of the present invention, with the system 10 operating in the normal mode, manual operation of the portable activator 12 generates a coded or uncoded activating signal 26 which is transmitted to the subscriber unit 20. The subscriber unit 20 is activated by the signal 26 and processes the received signal 26 to transmit an alarm signal to the central station 16 via the communications link 18. The alarm message may include remote subscribe station 14 identification data in addition to the alarm data. Concomitantly, the subscriber unit 20 may activate the local annunciator 24 to inform the subscriber that the alarm signal has been transmitted.

In another embodiment, the subscriber unit 20 includes a multi-state selection means as described in the co-pending application entitled A MULTI-STATE SELECTION SWITCH FOR A 11 PERSONAL EMERGENCY RESPONSE SYSTEM. The subscriber unit 20 of this embodiment is selectively operable in HOME (normal) or AWAY modes. In the AWAY mode, the portable activator may be used to transmit an activating signal to initiate a predetermined function associated with a functional subsystem. The functional subsystem may or may not be interfaced with the subscriber unit 20 of the personal emergency response system. It is to be understood that for such systems, operation of the portable activator 12 with the subscriber unit 20 in the AWAY mode will cause the latch assembly to assume the set state.

The portable activator of FIG. 1 is a portable transmitter of the type known in the art and generally includes a housing containing a power source and a transmitter subsystem. A representative example of such a portable transmitter is disclosed in U.S. Pat. No. 4,491,970 owned by the assignee of the present invention. The transmitter subsystem may be of a type generally known in the art such as a radio transmission system, an infrared transmission system or an ultrasonic transmission system.

The portable activator 12 includes a personal help button (PHB) 13 which is designed to be manually operated by the subscriber to transmit the activating signal 26. The PHB 13 may be of a type known in the art. The PHB 13 may be externally located on a face of the housing of the portable activator 12 or may be mounted within the housing and actuated by manually depressing a flexible diagram formed as part of the face of the housing.

Figure 2A:
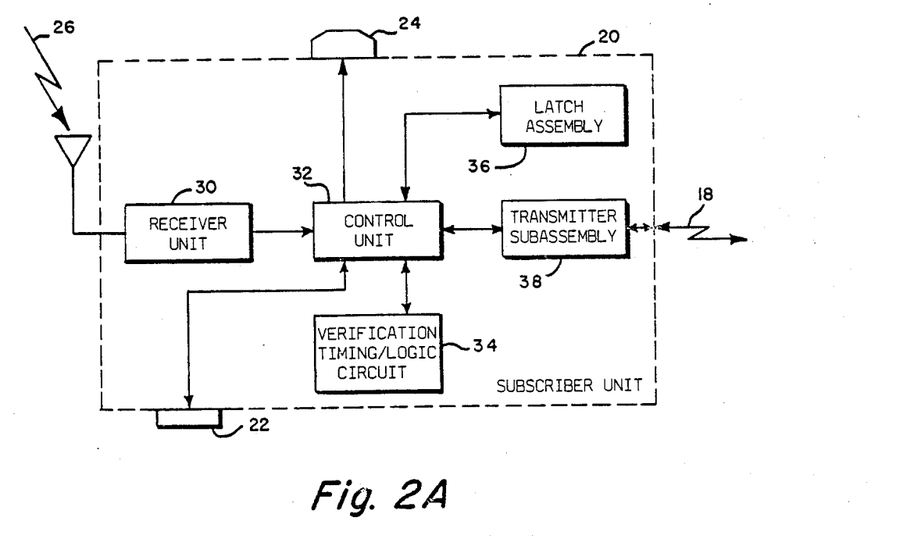
FIG. 2A is a block diagram of one embodiment of a subscriber unit according to the present invention.

One embodiment of the subscriber unit 20 according to the present invention is depicted in block diagram in FIG. 2A and includes a receiver unit 30, a control unit 32 such as a microprocessor, a verification timing/logic circuit 34, a latch assembly 36 and a transmitter subassembly 38. It is to be understood that the subscriber unit 20 may include other subsystems typically found in such units or as disclosed herein.

The verification timing/logic circuit 34, for example, is illustrated as a separate circuit for purpose of explication only, but alternately could be one subelement of a general timing/logic circuit, as for example in subscriber units which are automatically activated after elapse of a predetermined period of time to transmit an alarm message to the central station 16.

The receiver unit 30 is operative to receive the activating signal 26 transmitted by the corresponding portable activator 12. The receiver unit 30 may include a demodulator for systems 10 utilizing a coded activating signal 26, as for example where there are a large number of subscriber stations 14 within a small area (e.g. apartment complexes).

In the normal or HOME mode, the activating signal 26 activates the control unit 32 which regulates the overall operation of the subscriber unit 20. For example, the control unit 32 activates the transmitter subassembly 38 to transmit the initial alarm signal and any follow-on messages to the central station 16.

In the AWAY mode, the activating signal 26 activates the control unit 32 to implement a function set or protocol which disenables or inhibits the subscriber unit 20 to preclude operation thereof as a personal emergency response system in response to any activating signal 26 transmitted by the portable activator 12. Thus, while in the AWAY mode the subscriber unit 20 cannot transmit an alarm message to the central station in response to any activating signal transmitted by the portable activator 12.

In one AWAY mode embodiment, the subscriber unit 20 is interfaced with one or more functional subsystems associated with the subscriber station 14. The control unit 32 is this AWAY mode executes one or more function sets or protocols to regulate and/or monitor the corresponding interfaced functional subsystems. The portable activator 12 can be utilized to initiate one or more predetermined functions related to the corresponding functional subsystem by transmitting the activating signal 26 to the subscriber unit 20. The control unit 32 is correspondingly activated to execute the function set or protocol to cause the predetermined function to be implemented.

In another AWAY mode embodiment, the subscriber unit 20 is not interfaced with any functional subsystems associated with the subscriber station 14. In this embodiment, the subscriber unit 20 is not activated to implement any function sets or protocols in response to any activating signal transmitted by the portable activator 12. Instead, the portable activator 12 can be utilized for command or control purposes in conjunction with a functional subsystem. The activating signal 26 transmitted by the portable activator 12 causes the functional subsystem to implement a predetermined function.

In all of the aforedescribed embodiments, the activating signal 26 transmitted by the portable activator 12 activates the control unit 32 of the subscriber unit 20. The control unit 32 causes the latch assembly 36 to assume the set state which is indicative of operation of the portable activator 12. The latch assembly 36 remains in the set state until reset in a manner to be described hereinbelow.

The control unit 32 may also activate and deactivate the local annunciator 24 in accordance with a predetermined protocol. The annunciator 24 generates a perceptible signal in the HOME or normal mode which indicates to the subscriber that the alarm message has been transmitted to the central station 16. As exemplary illustrated in FIGS. 1 and 2, the local annunciator 24 is a visual signal generating means such as a light emitting diode. It is to be understood, however, that the local annunciator 24 may also be an audible signal generating means, a tactile signal generating means or combinations thereof.

In another embodiment of the present invention, the test mode selection switch 22 is conveniently located on a face of the subscriber unit 20. Selective actuation of the test mode selection switch 22 places the subscriber unit 20 in the test mode. While the subscriber unit 20 is operating in the test mode, the control unit 32 will not activate the transmitter subassembly 38 in response to activating signals 26 transmitted by the portable activator 12, and therefore, no alarm messages will be transmitted by the subscriber unit 20 to the central station 16. Inactivation of the transmitter subassembly 38 may be effected by software programming, by mechanically disconnecting the transmitter subassembly 38 from the control unit 32, or other suitable means.

In one embodiment, actuation of the test mode selection switch 22 places the subscriber unit 20 in a test mode for a predetermined period of time which is determined by a test mode timing/logic circuit (not shown) in the control unit 32. Upon expiration of the predetermined test time period, the control unit 32 automatically returns the subscriber unit 20 to the normal mode.

In an alternative embodiment, selective actuation of the test mode selection switch 22 places the subscriber unit 20 in the test mode semipermanently. To return the subscriber unit 20 to the normal mode of operation, the subscriber must take positive action such as selectively reactuating the test mode selection switch 22 or other reset means.

As an additional feature, the test mode selection switch 22 may be associated with a light generating means such as an LED which illuminates the test mode selection switch 22 when the subscriber unit 20 is in the test mode. This provides the subscriber with a positive indication regarding the mode status of the subscriber unit 20. Alternatively, the physical position of the test mode selection switch 22 may be used to inform the subscriber of the mode status.

While operating in the test mode, activating signals 26 which are received by the receiving unit 30 activate the control unit 32 which subsequently activates the local annunciator 24. Activation of the local annunciator 24 provides a positive signal to the subscriber that the portable activator 12 has functioned and/or operated in the prescribed manner.

Conversely, if the local annunciator 24 does not generate a signal upon operation of the portable activator 12 by the subscriber, the subscriber is informed that the portable activator 12 may not be functioning properly, may be located outside its effective transmission range at the remote subscriber station 14 or may be located in a transmission deadspot at the remote subscriber station 14.

In addition to activating the local annunciator 24 upon receipt of an activating signal 26, the control unit 32 of the present invention causes the latch assembly 36 to be placed in the set state which indicates of operation of the portable activator 12 and the subscriber unit 20. The latch assembly 36 remains in the set state until reset in a manner to be described hereinbelow.

The latch assembly 36 is coupled to the control unit 32. The latch assembly 36 is a bistable electronic or mechanical element such as a two-position mechanical device or an on/off or high/low electronic device which may assume either a first or set state or a second or unset state.

The verification timing/logic circuit 34 included in the subscriber unit 20 or as a subelement in the equipment of the central station 16 is a mechanical or electronic counter or other time measuring device of the type known in the art. The verification timing/logic circuit 34 is operative to clock a predetermined period of time, for example, thirty days. After elapse of the predetermined period of time, step 50, FIGS. 3A 3B, the verification timing/logic circuit 34 is operative to effect activation of the control unit 32.

In the embodiment of FIG. 2A, the verification timing/logic circuit 34 is disposed within the subscriber unit 20 and directly coupled to the control unit 32. The verification timing/logic circuit 34 directly activates the control unit 32 as shown at step 52, FIG. 3A.

Figure 2B:
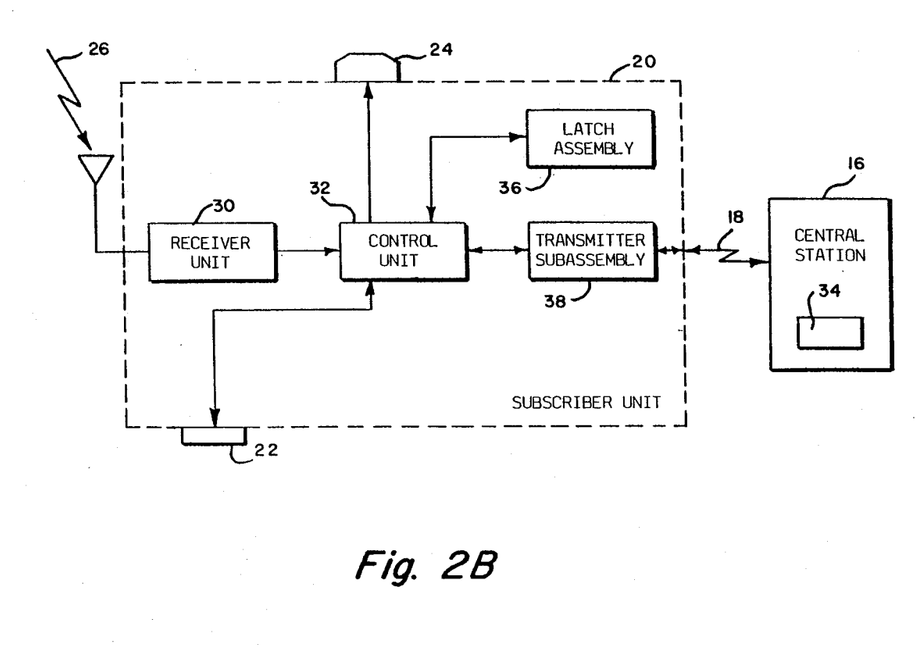
FIG. 2B is a block diagram of another embodiment of a subscriber unit and a central station according to the present invention.

In the embodiment of FIG. 2B, the verification timing/logic circuit 34 is part of the equipment of the central station 16. The verification timing/logic circuit 34 is operative upon elapse of the predetermined period of time, step 50, FIG. 3B, to cause the central station 16 to transmit a status check message SCM to a particular remote subscriber station 14 via the communications link 18 as shown at step 51a, FIG. 3B.

For example, the central station 16 may broadcast a singularly-addressed status check message SCM over a radio communications link 18 to the particular remote subscriber station 14 to cause the control unit 32 to poll the latch assembly 36. A similar operation may be effected for telephonic or other types of communications links.

Figure 3A:
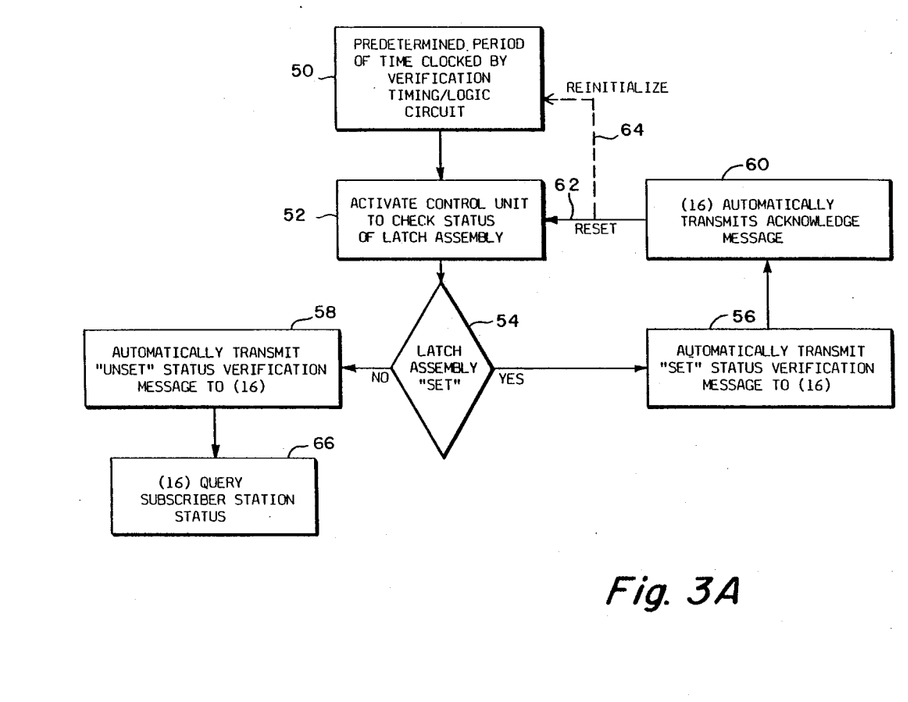
FIG. 3A is an exemplary protocol for generating a system test message for the embodiment of FIG. 2A.
Figure 3B:
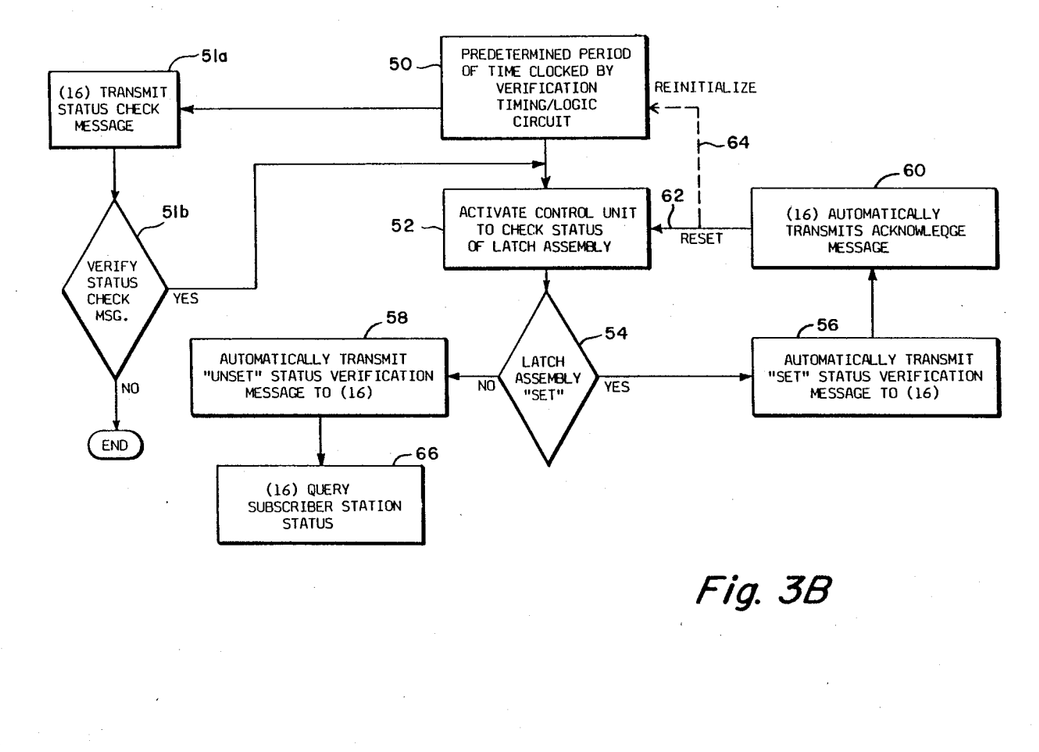
FIG. 3B is an exemplary protocol for generating a system test message for the embodiment of FIG. 2B.

The status check message SCM is received and processed by the transmitter subassembly 38, step 51b, FIG. 3B. After verifying that the status check message SCM is addressed to the corresponding remote subscriber station 14, the transmitter subassembly 38 activates the control unit 32 as shown at step 52, FIG. 3B.

In response to activation by means of the verification timing/logic circuit 34 or the status check message SCM, the control unit 32 polls the latch assembly 36 to determine the status thereof as shown at step 52, FIGS. 3A, 3B. The latch assembly 36 in the first or set state indicates that the subscriber has used the portable activator 12 within the preceding predetermined period of time. Conversely, if the latch assembly 36 is in the second or unset state, the subscriber has not used the portable activator 12 within the preceding predetermined period of time.

After ascertaining the status of the latch assembly 36, as shown at step 54, FIGS. 3A, 3B, the control unit 32 activates the transmitter subassembly 38. The transmitter subassembly 38 transmits a system test message STM having a predetermined format, as shown at step 56 or step 58, FIGS. 3A, 3B, to the central station 16 via the communications link 18.

The predetermined format of the system test message includes remote subscriber station 14 identification data as well as data indicating the type of message (status versus alarm). A predetermined segment of the system test message STM is used to indicate the status of the latch assembly 36, i.e., whether the latch assembly 36 is in the set state or the unset state. By way of example only, for a digital system test message one predetermined bit identifies the status of the latch assembly 36. A one bit may be used to indicate that the latch assembly 36 is in the set state while a zero bit may be used to indicate that the latch assembly 36 is in the unset state or vice versa.

Upon receipt of a system test message STM indicating that the latch assembly 36 is in the set state, step 56, FIGS. 3A, 3B, the central station 16 is apprised of the fact that the identified remote subscriber station 14 has used the corresponding portable activator 12 within the preceding predetermined period of time. The central station 16 may then automatically transmit an acknowledge signal ACK via the communications link 18 to the particular remote subscriber station 14. For the embodiment of FIG. 2B, the system test message STM may optionally be used to reinitialize the verification timing-/logic circuit 34 of the central station 16.

The acknowledge signal ACK has a predetermined format and includes a signal portion which will reset the latch assembly 36 of the particular remote subscriber station 14 as shown at step 62, FIGS. 3A, 3B. The acknowledge signal is processed by the transmitter subassembly 38 and activates the control unit 32. The control unit 32 resets the latch assembly 36 to the unset state.

Optionally, the acknowledge signal ACK may include a signal portion which will reinitialize the verification timing/logic circuit 34 of the particular remote subscriber station 14, step 64, FIGS. 3A, 3B. The control unit 32 thereof is activated by the reset signal and causes the verification timing/logic circuit 34 to be reinitialized to clock another predetermined period of time.

Alternatively, the verification timing/logic circuit 34 may rollover after the elapse of a second predetermined period of time which is sufficient for the system test protocol to be completed between the particular remote subscriber station 14 and the central station 16. That is, upon elapse of the second predetermined period of time, the verification timing/logic circuit 34 will immediately begin to clock the succeeding predetermined period of time.

In yet another alternative, the control unit 32 may automatically reset the latch assembly 36 to the second or unset state after checking the status thereof or after broadcasting the system test message STM. In this embodiment, the central station 16 need not transmit an acknowledge signal ACK unless the signal is needed t reinitialize the verification timing/logic circuit 34 of the subscriber unit 20.

If the system test message STM indicates that the latch assembly 36 is in the unset state, step 58, FIGS. 3A, 3B, the central station 16 is apprised of the fact that the portable activator 12 has not been used by the particular remote subscriber station 14 within the preceding predetermined period of time. In this case, the central station 16 will implement communications with the particular remote subscriber station 14, step 66, FIGS. 3A, 3B, to ascertain the status of the particular subscriber station 14 and/or request that the portable activator 12 be operated.

A variety of modifications and variations of the present invention are possible in light of the above teachings. It is therefore to be understood that within the scope of the appended claims, the present invention may be practiced otherwise than as specifically described hereinabove.

What is claimed is:

1. An apparatus for reporting verification testing of a personal emergency response system including a remote subscriber station capable of transmitting messages over a communications link to a central station, comprising:
   portable activator means selectively operable for generating an activating signal at the subscriber station;
   subscriber unit means disposed within the subscriber station and normally operative in response to said activating signal for transmitting one or more messages over the communications link to the central station;
   latch assembly means coupled to said subscriber unit means and operative in response to said activating signal for indicating operational status of said subscriber unit means and said portable activator means in combination during a predetermined period of time; and
   verification timing/logic means for clocking said predetermined period of time and operative in response to expiration of said predetermined period of time for effecting activation of said subscriber unit means to poll said latch assembly means to determine said operational status thereof and to transmit a system test message indicative of said operational status of said latch assembly means to the central station.

2. The apparatus of claim 1 further comprising
   test switch means coupled to said subscriber unit means and selectively actuatable for alternately operating said subscriber unit means in a test mode and a normal mode, operation of said subscriber unit means in said normal mode causing said subscriber unit means to transmit one or more messages over the communications link to the central station in response to said activating signal generated by selective operation of said portable activator means and operation of said subscriber unit means in said test mode causing said subscriber unit means to be responsive to said activating signal generated by selective operation of said portable activator means without transmission of messages to the central station, and wherein said latch assembly means is operative in response to said activating signal during said test mode and said normal mode to indicate the operational status of said subscriber unit means and said portable activator means in combination during said predetermined period of time.

3. The apparatus of claim 1 wherein said latch assembly means includes a first state corresponding to operation of said subscriber unit means and said portable activator means during said predetermined period of time and a second state corresponding to non-operation of said subscriber unit means and said portable activator mean during said predetermined period of time.

4. The apparatus of claim 3 further comprising:
   means for resetting said latch assembly means from said first state to said second state.

5. The apparatus of claim 4 wherein said resetting means is an acknowledge signal transmitted by the central station in response to said system test message, and further wherein the acknowledge signal is operative to activate said subscriber unit means to reset said latch assembly means.

6. The apparatus of claim 5 wherein the acknowledge signal is operative to reinitialize said verification timing-/logic means to clock another said predetermined period of time.

7. The apparatus of claim 1 wherein said system test message has a predetermined format including a status segment indicative of the operational status of said latch assembly.

8. The apparatus of claim 7 wherein said predetermined format of said system test message is a digital format and wherein said status segment is a digital bit indicative of the operational status of said latch assembly.

9. The apparatus of claim 1 wherein said verification timing/logic means is associated with said subscriber unit means and operative in response to expiration of said predetermined period of time to directly activate said subscriber unit means to poll said latch assembly means to determine the operational status thereof and to transmit said system test message indicative of the operational status of said latch assembly means to the central station.

10. The apparatus of claim 1 wherein said verification timing/logic means is associated with the central station and operative in response to expiration of said predetermined period of time to cause the central station to transmit a status check message over the communications link to the subscriber station, the status check message being operative to activate said subscriber unit means to poll said latch assembly means to determine the operational status thereof and transmit said system test message corresponding to the operational status of said latch assembly means to the central station.

11. The apparatus of claim 1 wherein said verification timing/logic means is operative after expiration of said predetermined period of time to clock a second period of time and wherein said verification timing/logic means is operative upon expiration of said second period of time to clock another said predetermined period of time.

12. A method for verifying the functioning of a personal emergency response system, the personal emergency response system including a subscriber station for transmitting messages over a communications link to a central station and wherein the subscriber station includes a portable activator selectively operable to generate an activating signal, a subscriber unit normally operative in response to said activating signal to transmit one or more messages over the communications link to the central station and a latch assembly operative in response to said activating signal to assume a first state indicating use of said subscriber unit and said portable activator in combination during a predetermined period of time, said latch assembly normally being in a second state indicating nonuse of said subscriber unit and said portable activator in combination during said predetermined period of time, comprising the steps of:

(a) clocking said predetermined period of time by means of a verification timing/logic circuit;
(b) effecting activation of said subscriber unit to poll said latch assembly upon expiration of said predetermined period of time to determine the state thereof; and
(c) transmitting a system test message indicative of the state of said latch assembly from the subscriber station to the central station by mean of the communications link.

13. The method of claim 12 further comprising the step of:
(d) resetting said latch assembly.

14. The method of claim 13 further comprising the step of:
(e) reinitializing said verification timing/logic circuit to clock another said predetermined period of time.

15. The method of claim 12 wherein said verification timing/logic circuit is coupled to said subscriber unit and wherein said activation effecting step further comprises:
(b) transmitting a signal to said subscriber unit from said verification timing/logic circuit upon expiration of said predetermined period of time to activate said subscriber unit to poll said latch assembly to determine the state thereof.

16. The method of claim 12 wherein said verification timing/logic circuit is part of the central station and wherein said activation effecting step further comprises:
(b1) activating the central unit to transmit a status check message to the subscriber station via the communications link after expiration of said predetermined period of time;
(b2) processing said status check message by said subscriber unit to verify said status check message is addressed to the subscriber station; and
(b3) activating said subscriber unit to poll said latch assembly to determine the state thereof.

* * * * *

UNITED STATES PATENT AND TRADEMARK OFFICE
CERTIFICATE OF CORRECTION

PATENT NO. : 4,884,059
DATED : November 28, 1989
INVENTOR(S) : L. Dennis Shapiro It is certified that error appears in the above-identified patent and that said Letters Patent is hereby corrected as shown below:

In Column 5, line 14, "...FOR A 11 PERSONAL..." should read --FOR A PERSONAL--.

In Column 9, line 32, "needed t" should read --needed to--.

In Column 10, line 40, "mean" should read --means--.

Signed and Sealed this

Fifth Day of May, 1992

Attest:

DOUGLAS B. COMER

*Attesting Officer*     *Acting Commissioner of Patents and Trademarks*